United States Patent
Nakagawa

(10) Patent No.: US 12,535,655 B2
(45) Date of Patent: Jan. 27, 2026

(54) MICROSCOPE OBJECTIVE

(71) Applicant: Evident Corporation, Tatsuno-machi (JP)

(72) Inventor: Koji Nakagawa, Nagano (JP)

(73) Assignee: Evident Corporation, Nagano (JP)

( * ) Notice: Subject to any disclaimer, the term of this patent is extended or adjusted under 35 U.S.C. 154(b) by 329 days.

(21) Appl. No.: 18/373,511

(22) Filed: Sep. 27, 2023

(65) Prior Publication Data

US 2024/0118519 A1 Apr. 11, 2024

(30) Foreign Application Priority Data

Oct. 6, 2022 (JP) .................................. 2022-161629

(51) Int. Cl.
*G02B 9/64* (2006.01)
*G02B 13/02* (2006.01)
*G02B 13/18* (2006.01)
*G02B 21/02* (2006.01)

(52) U.S. Cl.
CPC ............... *G02B 9/64* (2013.01); *G02B 13/02* (2013.01); *G02B 13/18* (2013.01); *G02B 21/02* (2013.01)

(58) Field of Classification Search
None
See application file for complete search history.

(56) References Cited

U.S. PATENT DOCUMENTS

| 2013/0293859 | A1* | 11/2013 | Wu | G03F 7/7015 |
| | | | | 355/55 |
| 2014/0218811 | A1* | 8/2014 | Yamamoto | A61B 1/00188 |
| | | | | 359/749 |
| 2018/0100995 | A1* | 4/2018 | Nishio | G02B 15/144511 |
| 2022/0026669 | A1* | 1/2022 | Park | G02B 9/64 |

FOREIGN PATENT DOCUMENTS

JP 2000249927 A 9/2000

* cited by examiner

*Primary Examiner* — Robert E. Tallman
(74) *Attorney, Agent, or Firm* — Holtz, Holtz & Volek PC

(57) ABSTRACT

An objective includes a positive first lens group, a negative second lens group having one or more aspheric surface, a third lens group, and a positive fourth lens group consists of two lens components; wherein, $$1.6 \leq fL/TTL \leq 5 \quad (1)$$

$$1.5 \leq ER1/ER2 \quad (2)$$

$$D2/OTTL \leq 0.6 \quad (3)$$

are satisfied.

Herein, fL is a focal length. TTL is the distance from the surface closest to the object side to the surface closest to the image side. ER1 is an effective radius of the surface closest to the object side. ER2 is an effective radius of the surface of the second lens group closest to the object side. D2 is the distance from the object plane to the surface of the second lens group closest to the image side. OTTL is the distance from the object plane to the surface closest to the image side.

21 Claims, 11 Drawing Sheets

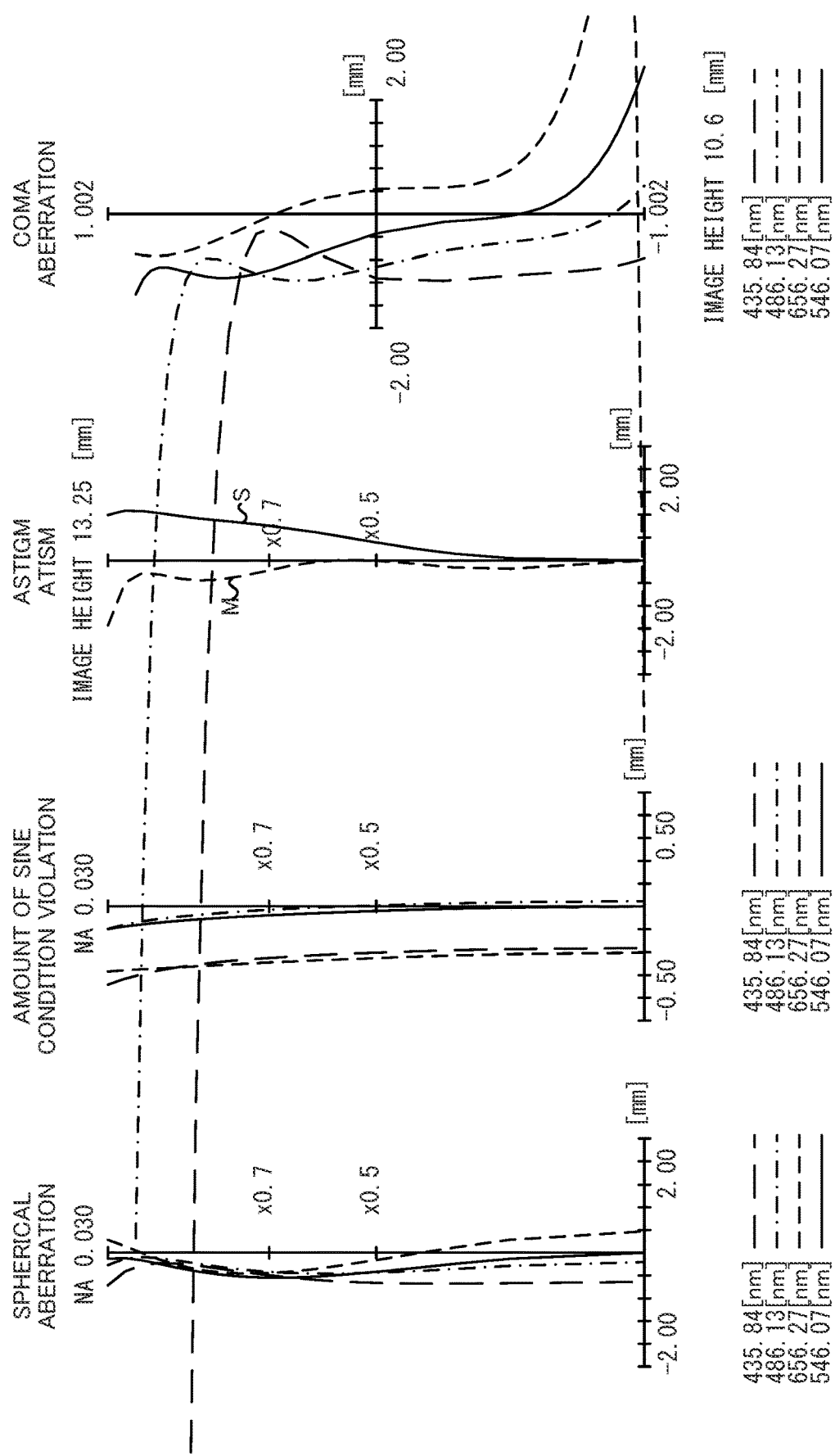

MICROSCOPE OBJECTIVE

CROSS REFERENCE TO RELATED APPLICATIONS

This application is based upon and claims the benefit of priority from prior Japanese Patent Application No. 2022-161629, filed Oct. 6, 2022, the entire contents of which are incorporated herein by this reference.

BACKGROUND OF THE INVENTION

Field of the Invention

The disclosure of the present specification relates to an objective.

Description of the Related Art

Recently, in the field of microscopes, microscope equipment that can carry out observation and image acquisition achieving both a wide field of view and high resolving power has become a mainstream. For example, JP 2000-249927 A describes an objective that enables observation of a wide range of a sample.

SUMMARY OF THE INVENTION

An objective according to one aspect of the present invention includes, in order from an object side, a first lens group that has positive refractive power, a second lens group that has one or more aspheric surface and has negative refractive power, a third lens group, and a fourth lens group that consists of two lens components and has positive refractive power. The objective satisfies following conditional expressions, a surface of the second lens group that is situated closest to the object side is the surface that is situated closest to the object side among surfaces of the objective that have an effective radius of ER 1/1.5 or less, and a surface of the second lens group that is situated closest to an image side is the surface, among the surfaces of the objective that are disposed at positions distant from an object plane by a distance of 0.6×OTTL or less on an optical axis, that is situated closest to the image side.

$$1.6 \leq fL/TTL \leq 5 \quad (1)$$

$$1.5 \leq ER1/ER2 \quad (2)$$

$$D2/OTTL \leq 0.6 \quad (3)$$

Herein, fL is a focal length of the objective. TTL is a distance on an optical axis from a surface of the objective that is situated closest to the object side to a surface of the objective that is situated closest to the image side. ER1 is an effective radius of the surface of the objective that is situated closest to the object side. ER2 is an effective radius of the surface of the second lens group that is situated closest to the object side. D2 is a distance on the optical axis from the object plane to the surface of the second lens group that is situated closest to the image side. OTTL is a distance on the optical axis from the object plane to the surface of the objective that is situated closest to the image side.

BRIEF DESCRIPTION OF THE DRAWINGS

The present invention will be more apparent from the following detailed description when the accompanying drawings are referenced.

FIGS. 11A to 11D are diagrams of aberrations in an optical system including the objective and the tube lens.

DESCRIPTION OF THE EMBODIMENTS

Figure 1:
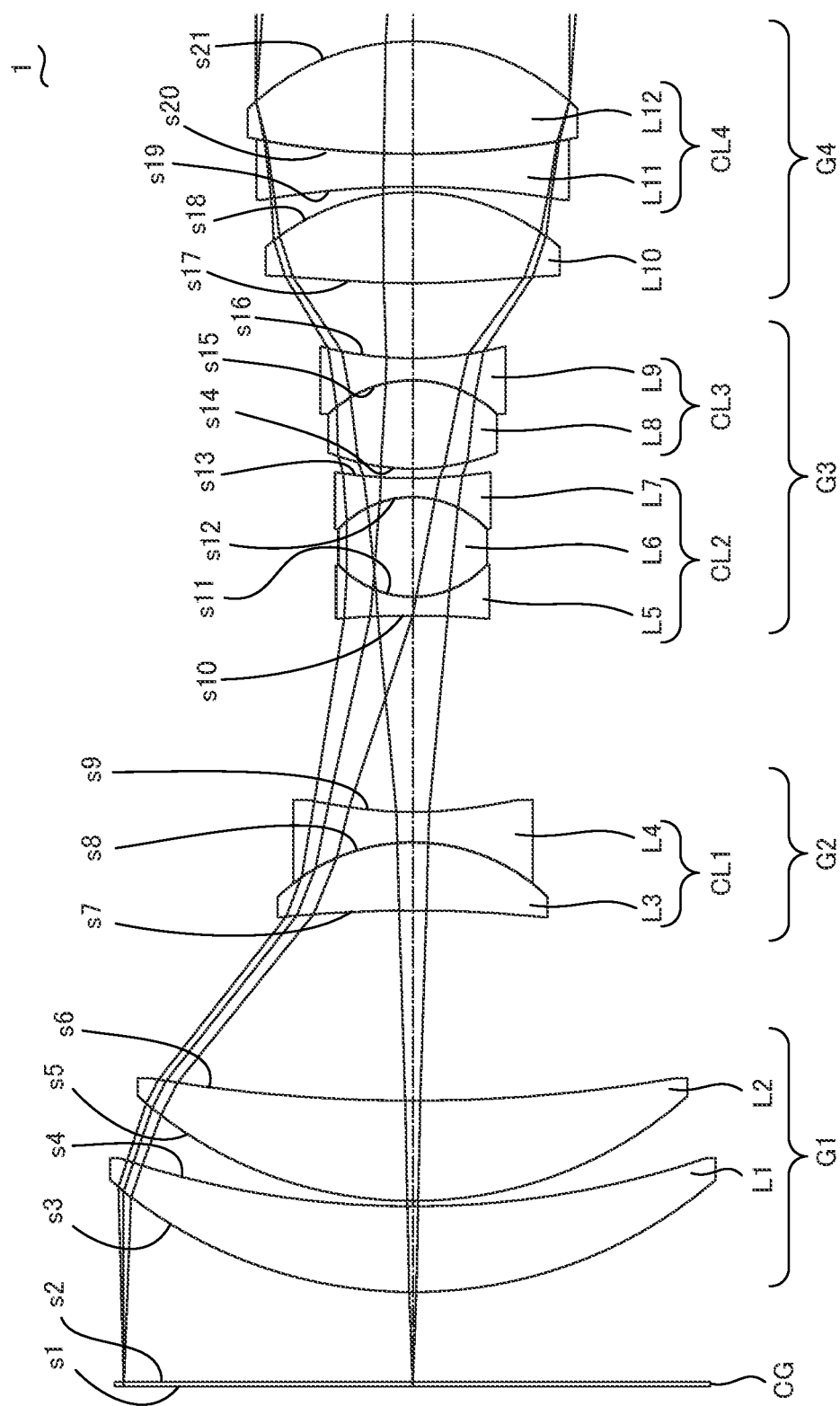
FIG. 1 is a cross-sectional view of an objective according to a first example of the present invention.

Meanwhile, microscope equipment is desired to have uniform image quality from a center to a periphery. However, when an image of a wide range of a sample is acquired by using an ultra-low magnification objective of 1-power or 1.25-power, it is not easy to satisfy this demand.

For example, in the objective described in 2000-249927 A, aberration correction from the center to the periphery, particularly, correction of off-axis aberrations such as curvature of field is insufficient. As described above, conventional techniques have room for improvement in uniformity of image quality in images.

Considering such circumstances, an embodiment of the present invention will be described hereinafter.

An objective according to an embodiment of the present application will be described. The objective according to the present embodiment (hereinafter, simply referred to as an objective) is an infinity-corrected microscope objective used in combination with a tube lens.

The objective includes, in order from an object side, a first lens group having positive refractive power, a second lens group having negative refractive power, a third lens group, and a fourth lens group having positive refractive power. The fourth lens group consists of two lens components.

In the present specification, the lens component refers to a lens block in which only two surfaces, i.e., a surface on the object side and a surface on an image side, from among lens surfaces through which a light ray from an object point passes have contact with air regardless of whether the lens is a single lens or a cemented lens. In other words, one single lens is one lens component, and one cemented lens is also one lens component. On the other hand, a plurality of single lenses and a plurality of cemented lenses arranged via air are not referred to as one lens component herein.

The size of an optical system constituting the microscope objective is practically limited, and is required to fall within a predetermined size. In order to achieve an ultra-low magnification objective having a wide field of view by such an optical system having a predetermined size, it is desirable to employ a telephoto-type optical system capable of increasing a focal length without increasing the size. In order to realize the telephoto-type, it is desirable to dispose a lens group having positive refractive power in the object side and dispose, in the rear thereof, a lens group having negative refractive power. Furthermore, in order to realize the infinity-corrected objective, it is desirable to dispose a lens group having positive refractive power as the lens group situated closest to the image side in order to change the divergent light, which has been emitted from the lens group having the negative refractive power, to parallel light. In view of the foregoing, it is desirable to employ the above described power arrangement for the in total four groups constituting the objective.

In order to achieve the characteristic to shorten the total length of the optical system more than the focal length (hereinafter, referred to as telephoto capability), the second lens group is required to have large negative refractive power. However, if large negative refractive power is imparted to the second lens group, the Petzval sum tends to be excessively corrected, and, as a result, it becomes difficult to satisfactorily correct curvature of field in the whole objective. The objective according to the present embodiment deals with such a technical problem by providing one or more aspheric surface(s) in the second lens group.

Since the second lens group is at a position comparatively close to the object plane, a difference between the light ray height of axial light flux and the light ray height of most off-axis light flux is sufficiently ensured, and the light flux diameter of each light flux is sufficiently small Therefore, in the second lens group, the axial light flux and the most off-axis light flux is spatially separated from each other, and each light flux passes through a different position on the lens surface. Therefore, the position of the second lens group is suitable for correcting curvature of field, and, by providing an aspheric surface in the second lens group, the effect of correcting curvature of field by the aspheric surface can be sufficiently exerted. Specifically, by providing the aspheric surface so that excessive correction of the Petzval sum, which is caused by a spherical surface, is eliminated, the curvature of field can be sufficiently corrected by the whole objective.

Since the light ray height is rapidly reduced by the positive refractive power of the first lens group, the light ray height in the second lens group is lower than the light ray height in the first lens group. Therefore, the second lens group includes lenses having effective radii smaller than those of the lenses of the first lens group. By providing the aspheric surface in the second lens group having such a small effective radius, the aspheric lens, which costs more than normal lenses, can be formed to be small By virtue of this, cost can be lowered compared with the case in which the aspheric surface is provided in the first lens group, and high surface accuracy can be maintained.

The objective built as described above is configured to satisfy following conditional expressions (1) to (3).

$$1.6 \leq fL/TTL \leq 5 \quad (1)$$

$$1.5 \leq ER1/ER2 \quad (2)$$

$$D2/OTTL \leq 0.6 \quad (3)$$

Herein, fL is a focal length of the objective. TTL is a distance on an optical axis from a surface of the objective that is situated closest to the object side to a surface of the objective that is situated closest to the image side. ER1 is the effective radius of the surface of the objective that is situated closest to the object side. ER2 is the effective radius of the surface of the second lens group that is situated closest to the object side. D2 is a distance on the optical axis from the object plane to the surface of the second lens group that is situated closest to the image side. OTTL is a distance on the optical axis from the surface of the object to the surface of the objective that is situated closest to the image side. The effective radius is the distance from the optical axis to a largest peripheral light ray that passes the corresponding surface.

Furthermore, the surface of the second lens group that is situated closest to the object side is, among the surfaces of the objective that have an effective radius of ER 1/1.5 or less, the surface that is situated closest to the object side. The surface of the second lens group that is situated closest to the image side is the surface, among the surfaces of the objective that are disposed at positions distant from the surface of the object by a distance on the optical axis of 0.6×OTTL or less, that is situated closest to the image side. A boundary between the second lens group and adjacent lens groups can be determined by these definitions.

A conditional expression (1) is a conditional expression for ensuring a wide field of view. When the conditional expression is satisfied, a wide field of view can be realized while building the objective compact.

In a case in which fL/TTL is lower than a lower limit value (1.6), when the objective is built by an allowed total length, the focal length of the objective becomes excessively short. As a result, it becomes difficult to ensure a sufficiently wide field of view. In a case in which fL/TTL is higher than an upper limit value (5), the field of view becomes excessively wide more than necessary or the total length of the objective becomes larger than an allowed range.

The conditional expression (2) and the conditional expression (3) are the conditional expressions for limiting the position to dispose the second lens group. The height of the light ray that enters the second lens group is limited by the conditions that the conditional expression (2) is satisfied and that the surface of the second lens group situated closest to the object side is the surface that is situated closest to the object side among the surfaces of the objective that have the effective radius of ER 1/1.5 or less. As a result, the position of the second lens group that is situated closest to the object side is limited. Also, the position of the second lens group that is situated closest to the image side is limited by the conditions that the conditional expression (3) is satisfied and that the surface of the second lens group situated closest to the image side is the surface that situated closest to the image side among the surfaces of the objective that are disposed at the positions, which are distant from the surface of the object by a distance of 0.6×OTTL or less on the optical axis. By disposing the second lens group within the range limited as described above, the light ray height that passes through the second lens group can be limited within a desirable range. Therefore, significant increase in manufacturing cost can be avoided while sufficiently correcting aberrations by the aspheric surface included in the second lens group.

If ER1/ER2 exceeds the lower limit value (0.6) of the conditional expression (2), the light ray height in the second lens group is not sufficiently lowered. Therefore, the second lens group has to be built with large lenses, and, as a result, an aspheric lens having a large effective radius is required. Therefore, it is difficult to sufficiently lower cost.

If D2/OTTL is lower than the upper limit value (1.5) of the conditional expression (3), the second lens group becomes excessively distant from the object plane. Therefore, overlapping of axial light flux and off-axis light flux in the second lens group increases. Therefore, it is difficult for the aspheric surface, which is provided in the second lens group, to act differently on the axial light flux and the off-axis light flux, and, as a result, it becomes difficult to sufficiently correct curvature of field.

According to the objective built in the above described manner, aberrations can be satisfactorily corrected from the center to the periphery of a wide field of view.

Note that the objective may be built to satisfy a following conditional expression (1-1) instead of the conditional expression (1). The objective may be built to satisfy a following conditional expression (2-1) instead of the conditional expression (2). The objective may be built to satisfy a following conditional expression (3-1) instead of the conditional expression (3).

$$3.11 \leq fL/TTL \leq 3.9 \tag{1-1}$$

$$1.76 \leq ER1/ER2 \leq 3.76 \tag{2-1}$$

$$0.420 \leq D2/OTTL \leq 0.579 \tag{3-1}$$

A desirable configuration of the objective will be described below.

All of the one or more aspheric surface(s) included in the second lens group is desired to have a curvature radius that increases as it gets away from the optical axis. In other words, it is desirable that the aspheric surface is built to have refractive power that is weakened as it gets closer to the periphery. Since the aspheric surface is built to have the refractive power that is weakened as it gets closer to the periphery, excessive correction of curvature of field in the second lens group having strong negative refractive power can be avoided, and on-axis spherical aberrations and off-axis astigmatism can be corrected with a good balance.

The fourth lens group is desired to have one or more aspheric surface(s). In the fourth lens group, axial light flux and off-axis light flux have large light flux diameters, and most of the light flux is overlapped with each other when entering the lens group. Therefore, different from the case in which the aspheric surface is provided in the second lens group in which the axial light flux and the off-axis light flux having small light flux diameters passes the mutually distant positions, the aspheric surface provided in the fourth lens group sufficiently acts on both of the axial light flux and the off-axis light flux. As a result, spherical aberrations and coma aberrations, which are residual aberrations that have not been completely corrected by the first lens group to the third lens group, can be corrected with a good balance.

The second lens group is desired to include a cemented lens including one or more positive lens(es) and one or more negative lens(es). Different from a case in which the second lens group is realized by using only a negative lens having strong negative refractive power, axial chromatic aberrations can be satisfactorily corrected together with Petzval sums by using the cemented lens including the positive lens and the negative lens.

The objective is desired to satisfy at least one of following conditional expressions (4) and (5).

$$0.8 \leq ofb/OTTL \leq 1.4 \tag{4}$$

$$0.03 \leq |f2/fL| \leq 0.15 \tag{5}$$

Herein, ofb is a distance on the optical axis from the object plane to a rear focal-point position of the objective. f2 is a focal length of the second lens group.

The conditional expression (4) is a conditional expression for ensuring telecentricity in the object side. When the conditional expression (4) is satisfied, the objective can be built as an optical system that is telecentric in the object side and is suitable as a microscope objective.

If ofb/OTTL is lower than the lower limit value (0.8) or ofb/OTTL is higher than the upper limit value (1.4), telecentricity in the object side is deteriorated. In the object-side telecentric optical system in which entrance pupil is at infinity, the position of exit pupil and the rear focal-point position match with each other. In an object-side telecentric optical system with a low-magnification objective having entrance pupil at infinity, a pupil plane is usually designed to be positioned in the vicinity of a lens surface at an image side. Therefore, high object-side telecentricity can be obtained when the lens surface that is situated closest to the image side is provided at a position that is not excessively distant from the rear focal-point position.

The conditional expression (5) is a conditional expression that defines the refractive power of the second lens group. When the conditional expression (5) is satisfied, the second lens group in which the axial light flux and the off-axis light flux is distant from each other has appropriate refractive power. As a result, curvature of field can be corrected, and high image field flatness can be ensured.

If $|f2/fL|$ is lower than the lower limit value (0.03), the negative refractive power of the second lens group becomes excessively large, and, therefore, curvature of field is excessively corrected. On the other hand, if $|f2/fL|$ is higher than the upper limit value (0.15), the negative refractive power of the second lens group becomes excessively small, and, therefore, curvature of field is insufficiently corrected.

Note that the objective may be built to satisfy a conditional expression (4-1) instead of the conditional expression (4) and may be built to satisfy a following conditional expression (5-1) instead of the conditional expression (5).

$$0.99 \leq ofb/OTTL \leq 1.36 \tag{4-1}$$

$$0.035 \leq |f2/fL| \leq 0.116 \tag{5-1}$$

Furthermore, at least one of the one or more aspheric surface(s) included in the second lens group is desired to satisfy a following conditional expression.

$$-0.45 \leq zG2 < 0 \tag{6}$$

Herein, zG2 is a sag z at an effective diameter of the aspheric surface included in the second lens group. The sag z of the aspheric surface is expressed by $z=(y^2/r)/[1+\{1-(1+k)(y/r)^2\}^{1/2}]+A4y^4+A6y^6+A8y^8+A10y^{10}$. y is the distance from the optical axis. k is a Conic constant (cone constant). r is a curvature radius in paraxial of the aspheric surface. A4, A6, A8, and A10 are fourth-order, sixth-order, eighth-order, and tenth-order aspheric surface coefficients, respectively. zG2 is calculated by assigning the effective diameter of the aspheric surface included in the second lens group to y, assigning the curvature radius of the aspheric surface included in the second lens group to r, and assigning the coefficients of the aspheric surface included in the second lens group to k, A4, A6, A8, and A10.

The conditional expression (6) is a conditional expression that defines the sag of the aspheric surface included in the second lens group. When the conditional expression (6) is satisfied, the aspheric surface has a minus sag in the effective diameter. As a result, the curvature of the aspheric surface in the effective diameter becomes moderate compared with a spherical surface, and, therefore, excessive correction can be appropriately avoided.

Hereinafter, examples of the objective described above will be described in detail.

First Example

FIG. 1 is a cross-sectional view of an objective 1 according to the present example. The objective 1 is a microscope objective and includes a first lens group G1 having positive refractive power, a second lens group G2 having one or more aspheric surface(s) and having negative refractive power, a third lens group G3, and a fourth lens group G4 consisting of two lens components and having positive refractive power.

The first lens group G1 includes, in order from a side of an object, a lens L1 which is a meniscus lens having a concave surface facing an image side and a lens L2 which is a meniscus lens having a concave surface facing the image side.

The second lens group G2 includes a cemented lens CL1. The cemented lens CL1 is a two-piece cemented lens including, in order from the object side, a lens L3 that is a meniscus lens having a concave surface facing the object side and a lens L4 that is a biconcave lens. The lens L3 is a positive lens, and the lens L4 is a negative lens.

The third lens group G3 includes, in order from the object side, a cemented lens CL2 and a cemented lens CL3. The cemented lens CL2 is a three-piece cemented lens including, in order from the object side, a lens L5 that is a biconcave lens, a lens L6 that is a biconvex lens, and a lens L7 that is a biconcave lens. The cemented lens CL3 is a two-piece cemented lens including, in order from the object side, a lens L8 that is a biconvex lens and a lens L9 that is a biconcave lens.

The fourth lens group G4 consists of, in order from the object side, a lens L10 that is a biconvex lens and a cemented lens CL4. The cemented lens CL4 is a two-piece cemented lens including, in order from the object side, a lens L11 that is a biconcave lens and a lens L12 that is a biconvex lens.

Various data of the objective 1 are as follows. Note that β is a magnification for a case where the objective 1 is combined with a later-described tube lens 10. NAob is a numerical aperture on the object side of the objective 1. fL, f1, f2, f3, and f4 are the focal length of the objective, the focal length of the first lens group G1, the focal length of the second lens group G2, the focal length of the third lens group G3, and the focal length of the fourth lens group G4, respectively. The other parameters are as described above.

NAob=0.04, fL=143.51 mm, TTL=45.91 mm, ER1=10.80 mm, ER2=4.64 mm, D2=21.10 mm, OTTL=49.38 mm, ofb=49.12 mm, f1=18.51 mm, f2=−9.25 mm, f3=−3.78 mm, f4=11.35 mm Lens data of the objective 1 is as follows. Note that INF in the lens data represents infinity (∞). The mark * on the side of a surface number means that the surface is an aspheric surface. More specifically, the lens L4 and the lens L10 are aspheric lenses.

| Objective 1 | | | | | |
|---|---|---|---|---|---|
| S | r | d | ne | vd | er |
| 1 | INF | 0.17 | 1.52626 | 54.41 | 10.60 |
| 2 | INF | 3.30 | | | 10.60 |
| 3 | 17.033 | 3.15 | 1.82017 | 46.62 | 10.80 |
| 4 | 33.577 | 0.20 | | | 10.48 |
| 5 | 15.110 | 3.68 | 1.60520 | 65.44 | 9.78 |
| 6 | 56.368 | 7.00 | | | 9.34 |
| 7 | −46.993 | 2.50 | 1.53430 | 48.84 | 4.64 |
| 8 | −7.096 | 1.10 | 1.80944 | 40.81 | 4.09 |
| 9 | 14.846 | 7.22 | | | 3.61 |
| 10 | −32.773 | 0.68 | 1.79196 | 47.37 | 2.52 |
| 11 | 3.730 | 3.66 | 1.67765 | 32.10 | 2.42 |
| 12 | −3.730 | 0.68 | 1.85646 | 40.78 | 2.42 |
| 13 | 18.002 | 0.35 | | | 2.56 |
| 14 | 8.319 | 3.25 | 1.59667 | 35.31 | 2.73 |
| 15 | −4.463 | 0.80 | 1.88815 | 40.76 | 2.79 |
| 16 | 13.301 | 2.76 | | | 3.10 |
| 17* | 30.000 | 3.35 | 1.58487 | 59.32 | 4.68 |
| 18* | −8.025 | 0.20 | | | 5.09 |
| 19 | −31.187 | 1.20 | 1.89760 | 37.13 | 5.19 |
| 20 | 31.187 | 4.13 | 1.43985 | 94.93 | 5.44 |
| 21 | −8.571 | 56.62 | | | 5.74 |

Herein, s represents a surface number, r represents a curvature radius (mm), d represents a surface spacing (mm), ne represents a refractive index with respect to an e-line, vd represents the Abbe number with respect to a d-line, and er represents an effective radius (mm). These symbols are the same in the following examples. Note that surfaces represented by surface numbers s1 and s2 are a sample-side surface and a surface in the objective 1 side of a cover glass CG, respectively. Surface numbers s3 and s21 represent a lens surface of the objective 1 that is situated closest to the object side and a lens surface of the objective 1 that is situated closest to the image side, respectively. For example, a surface spacing d1 represents a distance on an optical axis from the surface represented by the surface number s1 to the surface represented by the surface number s2. A surface spacing d21 represents a distance (56.62 mm) on the optical axis from the surface represented by the surface number s21 to the surface of the tube lens that is situated closest to the object side.

Aspheric surface data of the objective 1 is as follows. Note that e is a power of 10. zG2 is a sag at an effective diameter of the aspheric surface in the second lens group.

Surface Number s9
k=0.0000, A4=−1.8596 e−04, A6=3.1883 e−06, A8=−7.1835 e−07, zG2=−0.05

Surface Number s17
k=0.0000, A4=−2.5697 e−04, A6=1.1691 e−07, A8=1.5505 e−08

Surface Number s18
k=0.0000, A4=7.0046 e−05, A6=2.2230 e−07, A8=−1.8260 e−08

The objective 1 satisfies conditional expressions (1) to (5) as described below.

$$fL/TTL=3.126 \tag{1}$$

$$ER1/ER2=2.33 \tag{2}$$

$$D2/OTTL=0.427 \tag{3}$$

$$ofb/OTTL=0.995 \tag{4}$$

$$|f2/fL|=0.064 \tag{5}$$

Figure 2:
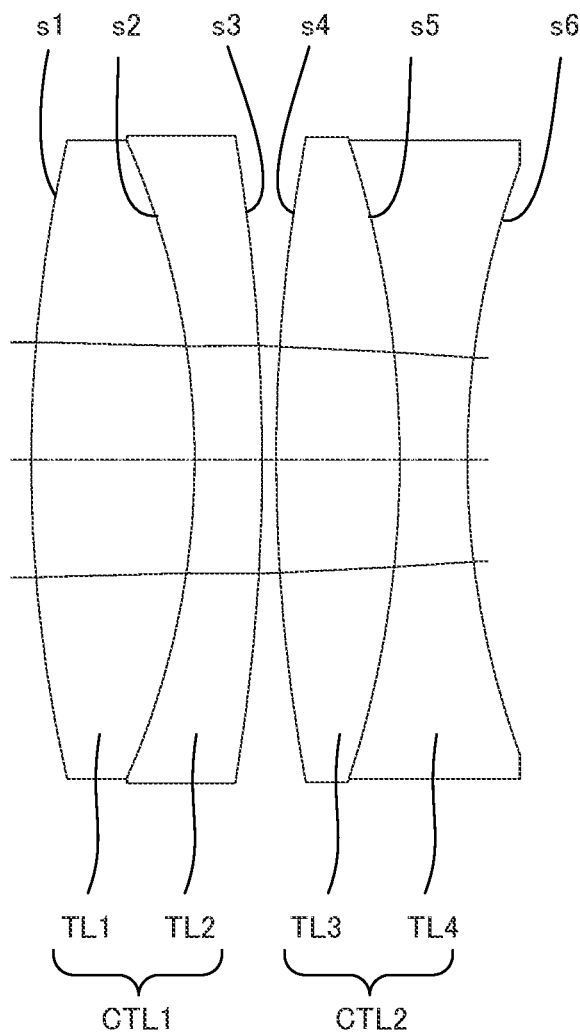
FIG. 2 is a cross-sectional view of a tube lens.

FIG. 2 is a cross-sectional view of the tube lens 10 used in combination with the objective 1. The tube lens 10 is a microscope tube lens that forms an image of an object in combination with the infinity-corrected objective. The tube lens 10 includes a cemented lens CTL1 and a cemented lens CTL2. The cemented lens CTL1 includes a lens TL1 that is a biconvex lens and a lens TL2 that is a meniscus lens having a concave surface facing the object side. The cemented lens CTL2 includes a lens TL3 that is a biconvex lens and a lens TL4 that is a biconcave lens. The tube lens 10 is disposed such that the distance on the optical axis from the lens surface (surface number s21) situated closest to the image side of the objective 1 to the lens surface (surface number s1) closest to the object side of the tube lens 10 is 56.62 mm. The focal length of the tube lens 10 is 180 mm.

Lens data of the tube lens 10 is as follows.

| Tube Lens 10 | | | | |
|---|---|---|---|---|
| S | r | d | ne | vd |
| 1 | 69.950 | 8.00 | 1.48915 | 70.23 |
| 2 | −38.132 | 3.30 | 1.83945 | 42.71 |
| 3 | −95.720 | 0.67 | | |
| 4 | 85.872 | 6.05 | 1.83932 | 37.16 |
| 5 | −50.111 | 3.30 | 1.65803 | 39.68 |
| 6 | 41.656 | | | |

Figure 3:
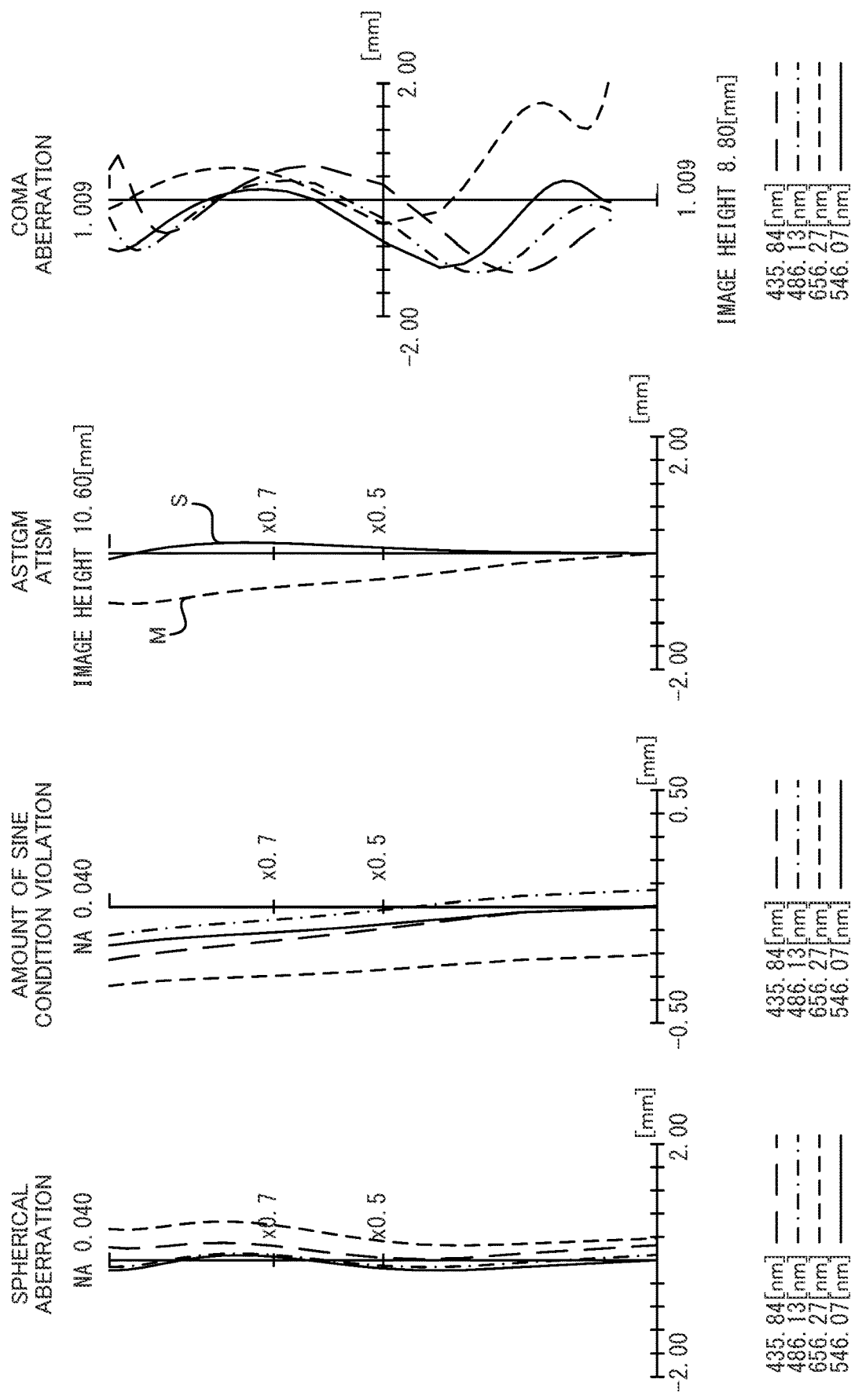
FIGS. 3A to 3D are diagrams of aberrations in an optical system including the objective and the tube lens.

FIGS. 3A to 3D are diagrams of aberrations in an optical system including the objective 1 and the tube lens 10, and illustrate aberrations on an image field on which the objective 1 and the tube lens 10 form an optical image. FIG. 3A is a diagram of spherical aberrations. FIG. 3B is a diagram illustrating the amounts of sine condition violation. FIG. 3C is an astigmatism diagram. FIG. 3D is a diagram illustrating coma aberrations at an image height ratio of 83% (image height of 8.8 mm). Note that in the diagram, "M" represents a meridional component, and "S" represents a sagittal component. As illustrated in FIGS. 3A to 3D, in the present example, the aberrations are satisfactorily corrected over a wide field of view.

Second Example

Figure 4:
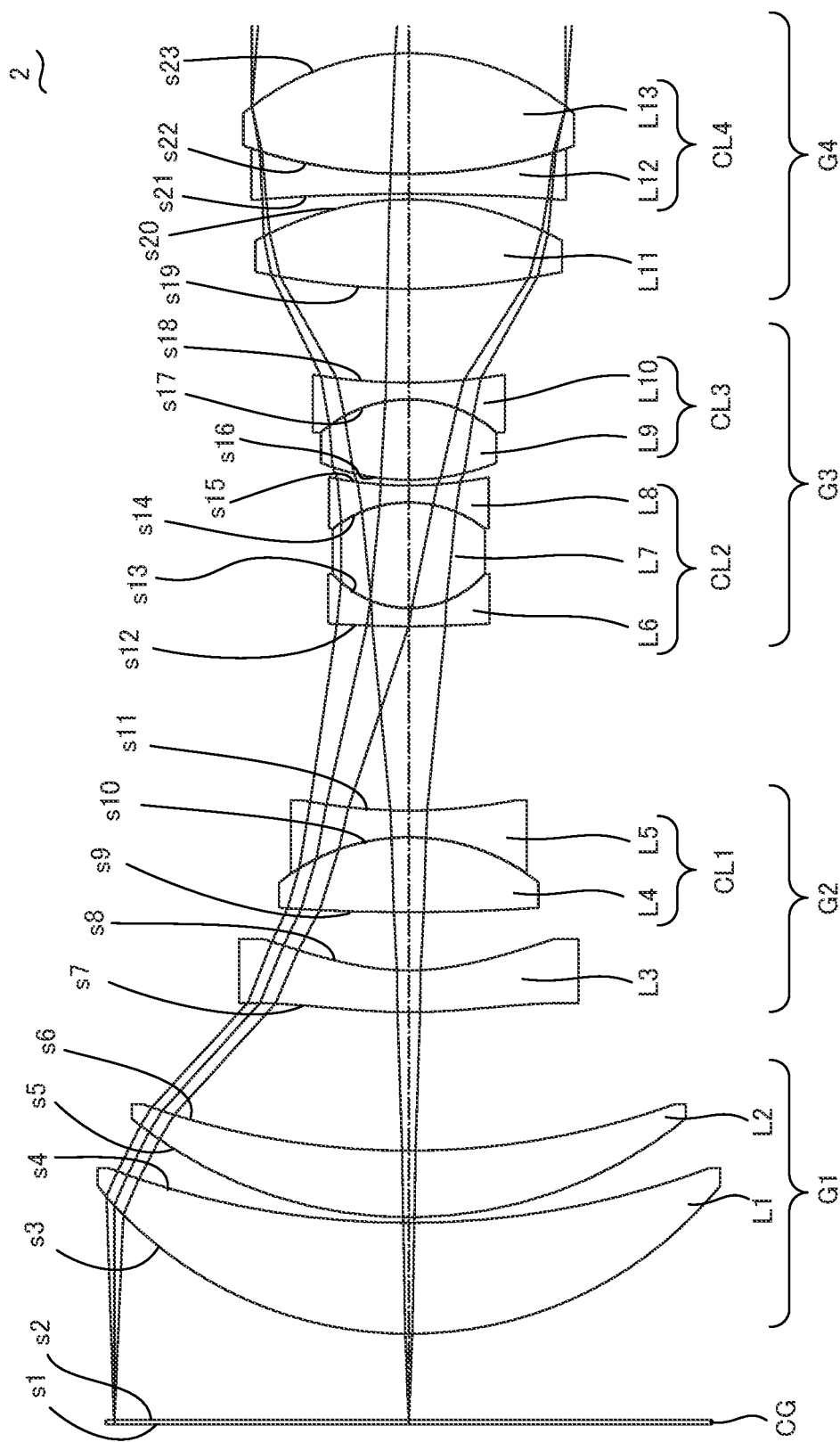
FIG. 4 is a cross-sectional view of an objective according to a second example of the present invention.

FIG. 4 is a cross-sectional view of an objective 2 according to the present example. The objective 2 is a microscope objective and includes a first lens group G1 having positive refractive power, a second lens group G2 having one or more aspheric surface(s) and having negative refractive power, a third lens group G3, and a fourth lens group G4 consisting of two lens components and having positive refractive power.

The first lens group G1 includes, in order from a side of an object, a lens L1 which is a meniscus lens having a concave surface facing an image side and a lens L2 which is a meniscus lens having a concave surface facing the image side.

The second lens group G2 includes, in order from the object side, a lens L3 that is a meniscus lens having a concave surface facing the image side and a cemented lens CL1. The cemented lens CL1 is a two-piece cemented lens including, in order from the object side, a lens L4 that is a biconvex lens and a lens L5 that is a biconcave lens.

The third lens group G3 includes, in order from the object side, a cemented lens CL2 and a cemented lens CL3. The cemented lens CL2 is a three-piece cemented lens including, in order from the object side, a lens L6 that is a meniscus lens having a concave surface facing the image side, a lens L7 that is a biconvex lens, and a lens L8 that is a biconcave lens. The cemented lens CL3 is a two-piece cemented lens including, in order from the object side, a lens L9 that is a biconvex lens and a lens L10 that is a biconcave lens.

The fourth lens group G4 consists of, in order from the object side, a lens L11 that is a biconvex lens and a cemented lens CL4. The cemented lens CL4 is a two-piece cemented lens including, in order from the object side, a lens L12 that is a biconcave lens and a lens L13 that is a biconvex lens.

Various data of the objective 2 are as follows.

NAob=0.039, fL=143.68 mm, TTL=46.11 mm, ER1=10.90 mm, ER2=5.81 mm, D2=22.12 mm, OTTL=49.38 mm, ofb=49.06 mm, f1=17.75 mm, f2=−8.11 mm, f3=−4.37 mm, f4=12.13 mm Lens data of the objective 2 is as follows. The mark * on the side of a surface number means that the surface is an aspheric surface. More specifically, the lens L3 and the lens L11 are aspheric lenses.

| Objective 2 | | | | | |
|---|---|---|---|---|---|
| S | r | d | ne | vd | er |
| 1 | INF | 0.17 | 1.52626 | 54.41 | 10.60 |
| 2 | INF | 3.10 | | | 10.60 |
| 3 | 14.428 | 4.00 | 1.82017 | 46.62 | 10.90 |
| 4 | 30.523 | 0.20 | | | 10.51 |
| 5 | 15.738 | 2.40 | 1.82017 | 46.62 | 9.67 |
| 6 | 28.171 | 5.00 | | | 9.27 |
| 7* | 22.500 | 1.50 | 1.81078 | 40.93 | 5.81 |
| 8* | 9.336 | 2.10 | | | 4.93 |
| 9 | 69.025 | 2.70 | 1.67765 | 32.10 | 4.37 |
| 10 | −7.500 | 0.95 | 1.89760 | 37.13 | 3.95 |
| 11 | 19.999 | 6.64 | | | 3.55 |
| 12 | 42.479 | 0.65 | 1.82017 | 46.62 | 2.60 |
| 13 | 3.638 | 3.80 | 1.59667 | 35.31 | 2.43 |
| 14 | −4.400 | 0.60 | 1.88815 | 40.76 | 2.43 |
| 15 | 13.701 | 0.20 | | | 2.58 |
| 16 | 8.344 | 2.90 | 1.59667 | 35.31 | 2.74 |
| 17 | −4.775 | 0.60 | 1.83945 | 42.74 | 2.86 |
| 18 | 21.127 | 3.39 | | | 3.16 |
| 19* | 22.986 | 3.22 | 1.58547 | 59.38 | 4.94 |
| 20* | −10.131 | 0.20 | | | 5.22 |
| 21 | −71.094 | 0.70 | 1.88815 | 40.76 | 5.27 |
| 22 | 17.830 | 4.36 | 1.43985 | 94.93 | 5.37 |
| 23 | −9.220 | 56.62 | | | 5.65 |

Aspheric surface data of the objective 2 is as follows.
Surface Number s7
  k=0.0000, A4=−3.7484 e−04, A6=−3.0582 e−06, A8=1.0117 e−07, A10=−5.3883 e−10, zG2=−0.44
Surface Number s8
  k=0.0000, A4=−5.4503 e−04, A6=−5.1281 e−06, A8=7.8971 e−08, zG2=−0.37
Surface Number s19
  k=0.0000, A4=−9.4556 e−05, A6=9.3031 e−07, A8=−4.8606 e−09
Surface Number s20
  k=0.0000, A4=1.0692 e−04, A6=1.2642 e−06, A8=1.0270 e−08

The objective 2 satisfies conditional expressions (1) to (5) as described below.

$$fL/TTL=3.116 \quad (1)$$

$$ER1/ER2=1.88 \quad (2)$$

$$D2/OTTL=0.448 \quad (3)$$

$$ofb/OTTL=0.994 \quad (4)$$

$$|f2/fL|=0.056 \quad (5)$$

Figure 5:
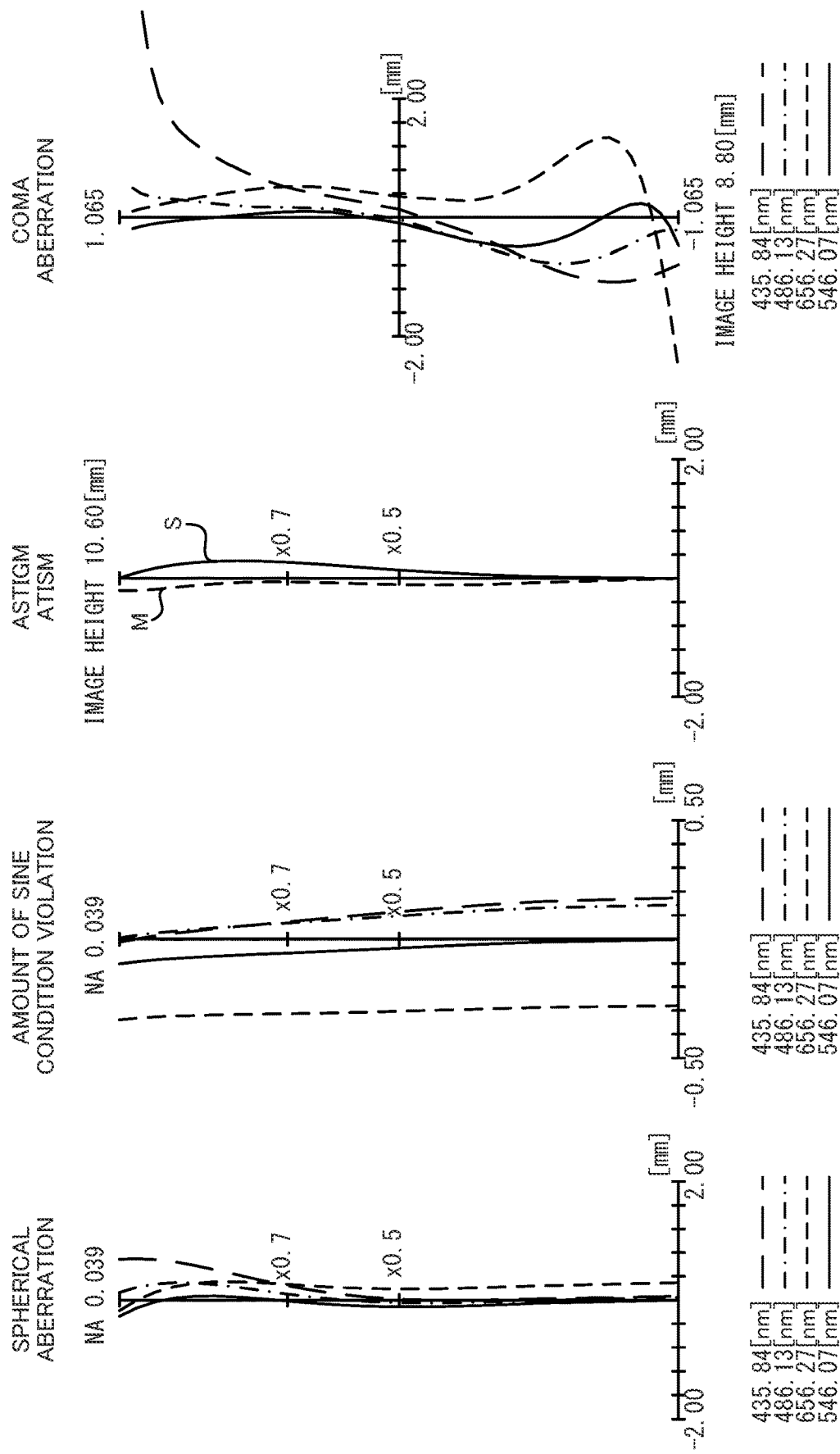
FIGS. 5A to 5D are diagrams of aberrations in an optical system including the objective and the tube lens.

FIGS. 5A to 5D are diagrams of aberrations in an optical system including the objective 2 and the tube lens 10 and illustrate aberrations on an image field on which the objective 2 and the tube lens 10 form an optical image. FIG. 5A is a diagram of spherical aberrations. FIG. 5B is a diagram illustrating the amounts of sine condition violation. FIG. 5C is an astigmatism diagram. FIG. 5D is a diagram illustrating coma aberrations at an image height ratio of 83% (image height of 8.8 mm). As illustrated in FIGS. 5A to 5D, in the present example, the aberrations are satisfactorily corrected over a wide field of view.

Third Example

Figure 6:
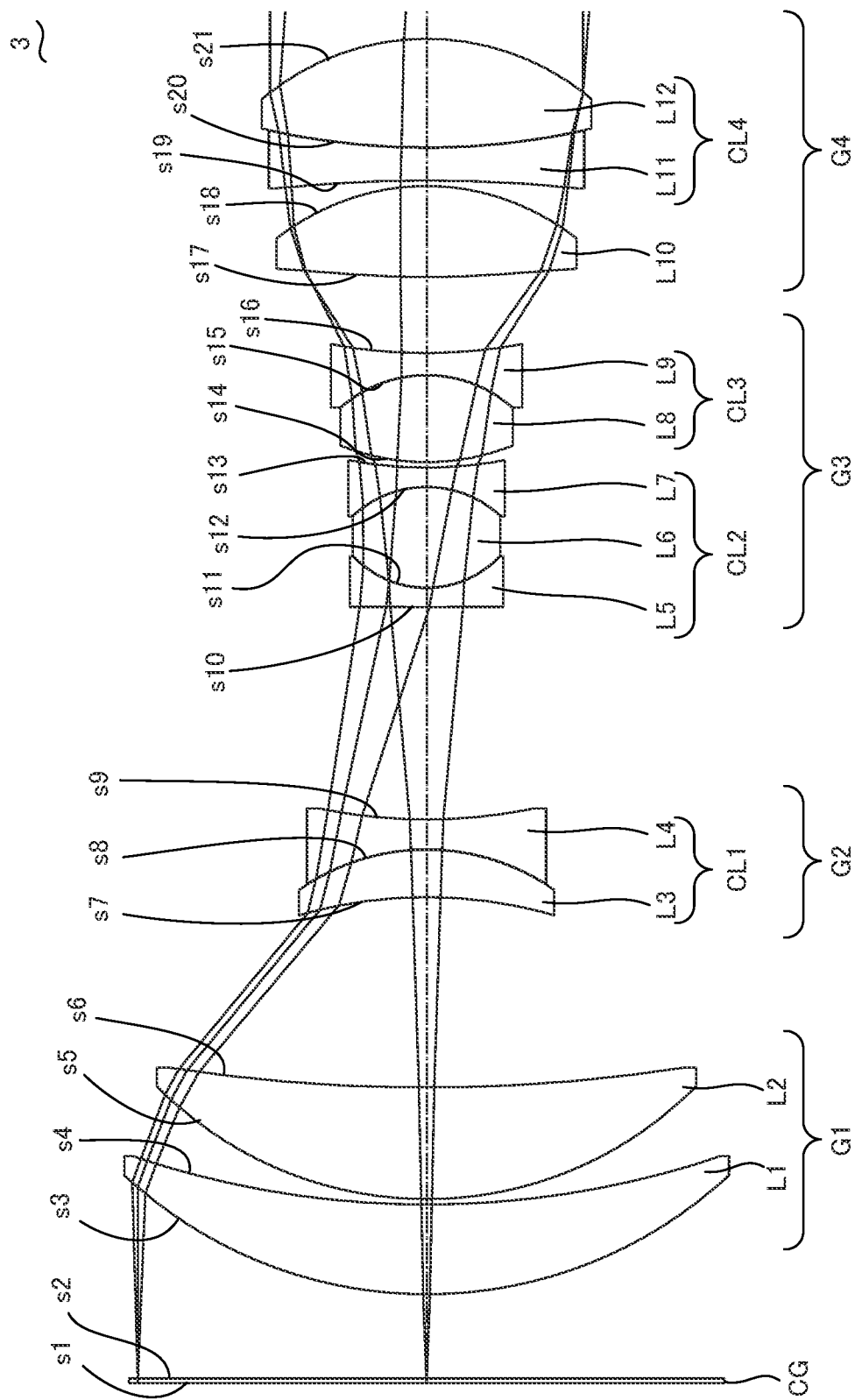
FIG. 6 is a cross-sectional view of an objective according to a third example of the present invention.

FIG. 6 is a cross-sectional view of an objective 3 according to the present example. The objective 3 is a microscope objective and includes a first lens group G1 having positive refractive power, a second lens group G2 having one or more aspheric surface(s) and having negative refractive power, a third lens group G3, and a fourth lens group G4 consisting of two lens components and having positive refractive power.

The first lens group G1 includes, in order from a side of an object, a lens L1 which is a meniscus lens having a concave surface facing an image side and a lens L2 which is a meniscus lens having a concave surface facing the image side.

The second lens group G2 includes a cemented lens CL1. The cemented lens CL1 is a two-piece cemented lens including, in order from the object side, a lens L3 that is a meniscus lens having a concave surface facing the object side and a lens L4 that is a biconcave lens. The lens L3 is a positive lens, and the lens L4 is a negative lens.

The third lens group G3 includes, in order from the object side, a cemented lens CL2 and a cemented lens CL3. The cemented lens CL2 is a three-piece cemented lens including, in order from the object side, a lens L5 that is a meniscus lens having a concave surface facing the image side, a lens L6 that is a biconvex lens, and a lens L7 that is a biconcave lens. The cemented lens CL3 is a two-piece cemented lens including, in order from the object side, a lens L8 that is a biconvex lens and a lens L9 that is a biconcave lens.

The fourth lens group G4 consists of, in order from the object side, a lens L10 that is a biconvex lens and a cemented lens CL4. The cemented lens CL4 is a two-piece cemented lens including, in order from the object side, a lens L11 that is a biconcave lens and a lens L12 that is a biconvex lens.

Various data of the objective 3 are as follows.
NAob=0.040, fL=143.45 mm, TTL=46.11 mm, ER1=10.80 mm, ER2=4.40 mm, D2=20.72 mm, OTTL=49.38 mm, ofb=49.05 mm, f1=18.28 mm, f2=−9.27 mm, f3=−3.91 mm, f4=11.46 mm Lens data of the objective 3 is as follows. The mark * on the side of a surface number means that the surface is an aspheric surface. More specifically, the lens L3 and the lens L10 are aspheric lenses.

| Objective 3 | | | | | |
|---|---|---|---|---|---|
| S | r | d | ne | vd | er |
| 1 | INF | 0.17 | 1.52626 | 54.41 | 10.60 |
| 2 | INF | 3.10 | | | 10.60 |
| 3 | 16.243 | 3.30 | 1.82017 | 46.62 | 10.80 |
| 4 | 33.534 | 0.20 | | | 10.49 |
| 5 | 13.858 | 4.10 | 1.49846 | 81.54 | 9.60 |
| 6 | 60.759 | 7.01 | | | 9.09 |
| 7* | −16.170 | 1.74 | 1.69473 | 31.02 | 4.40 |
| 8 | −8.144 | 1.10 | 1.83945 | 42.74 | 4.09 |
| 9 | 19.587 | 7.81 | | | 3.66 |
| 10 | 488.869 | 0.70 | 1.88815 | 40.76 | 2.52 |
| 11 | 3.684 | 3.70 | 1.67765 | 32.10 | 2.39 |
| 12 | −3.963 | 0.70 | 1.88815 | 40.76 | 2.42 |
| 13 | 14.755 | 0.20 | | | 2.58 |
| 14 | 8.398 | 3.20 | 1.59667 | 35.31 | 2.74 |
| 15 | −4.750 | 0.80 | 1.88815 | 40.76 | 2.87 |
| 16 | 18.609 | 2.80 | | | 3.22 |

-continued

| Objective 3 | | | | | |
|---|---|---|---|---|---|
| S | r | d | ne | vd | er |
| 17* | 33.797 | 3.35 | 1.58547 | 59.38 | 4.80 |
| 18* | −8.621 | 0.20 | | | 5.21 |
| 19 | −53.885 | 1.20 | 1.89760 | 37.13 | 5.32 |
| 20 | 26.569 | 4.00 | 1.43985 | 94.93 | 5.49 |
| 21 | −9.340 | 56.62 | | | 5.75 |

Aspheric surface data of the objective 3 is as follows.
Surface Number s7
k=0.0000, A4=1.4826 e−05, A6=−1.7563 e−06, A8=1.2432 e−07, zG2=−0.01
Surface Number s17
k=0.0000, A4=−1.8132 e−04, A6=8.5952 e−07, A8=−3.0572 e−09
Surface Number s18
k=0.0000, A4=4.8685 e−05, A6=3.7086 e−07, A8=−8.1766 e−10

The objective 3 satisfies conditional expressions (1) to (5) as described below.

$fL/TTL=3.111$ (1)

$ER1/ER2=2.46$ (2)

$D2/OTTL=0.420$ (3)

$ofb/OTTL=0.993$ (4)

$|f2/fL|=0.065$ (5)

Figure 7:
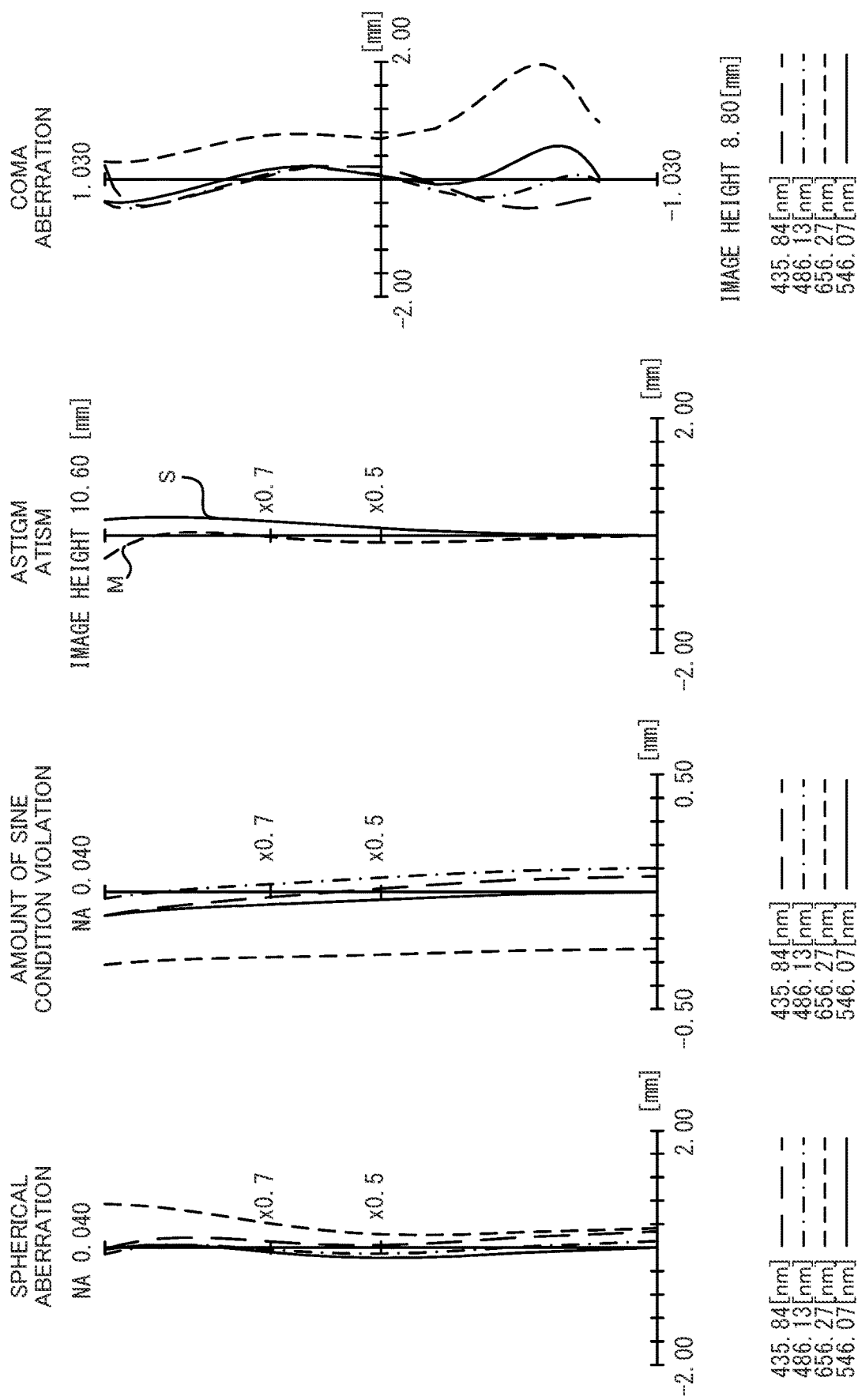
FIGS. 7A to 7D are diagrams of aberrations in an optical system including the objective and the tube lens.

FIGS. 7A to 7D are diagrams of aberrations in an optical system including the objective 3 and the tube lens 10 and illustrate aberrations on an image field on which the objective 3 and the tube lens 10 form an optical image. FIG. 7A is a diagram of spherical aberrations. FIG. 7B is a diagram illustrating the amounts of sine condition violation. FIG. 7C is an astigmatism diagram. FIG. 7D is a diagram illustrating coma aberrations at an image height ratio of 83% (image height of 8.8 mm). As illustrated in FIGS. 7A to 7D, in the present example, the aberrations are satisfactorily corrected over a wide field of view.

Fourth Example

Figure 8:
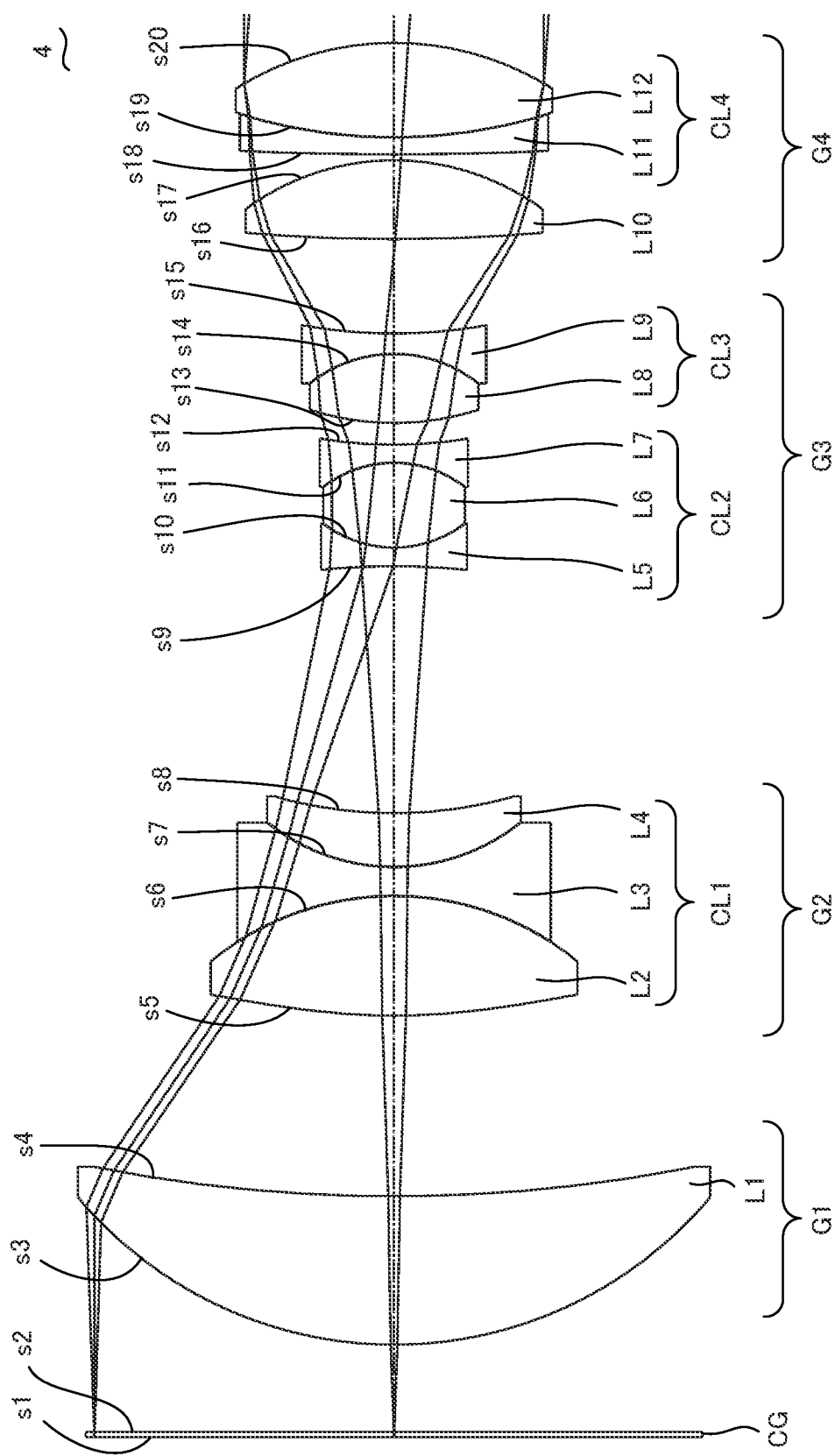
FIG. 8 is a cross-sectional view of an objective according to a fourth example of the present invention.

FIG. 8 is a cross-sectional view of an objective 4 according to the present example. The objective 4 is a microscope objective and includes a first lens group G1 having positive refractive power, a second lens group G2 having one or more aspheric surface(s) and having negative refractive power, a third lens group G3, and a fourth lens group G4 consisting of two lens components and having positive refractive power.

The first lens group G1 includes a lens L1 that is a meniscus lens having a concave surface facing the image side.

The second lens group G2 includes a cemented lens CL1. The cemented lens CL1 is a three-piece cemented lens including, in order from the object side, a lens L2 that is a biconvex lens, a lens L3 that is a biconcave lens, and a lens L4 that is a meniscus lens having a concave surface facing the image side.

The third lens group G3 includes, in order from the object side, a cemented lens CL2 and a cemented lens CL3. The cemented lens CL2 is a three-piece cemented lens including, in order from the object side, a lens L5 that is a biconcave meniscus lens, a lens L6 that is a biconvex lens, and a lens L7 that is a biconcave lens. The cemented lens CL3 is a two-piece cemented lens including, in order from the object side, a lens L8 that is a biconvex lens and a lens L9 that is a biconcave lens.

The fourth lens group G4 consists of, in order from the object side, a lens L10 that is a biconvex lens and a cemented lens CL4. The cemented lens CL4 is a two-piece cemented lens including, in order from the object side, a lens L11 that is a meniscus lens having a concave surface facing the image side and a lens L12 that is a biconvex lens.

Various data of the objective 4 is as follows.
NAob=0.037, fL=143.46 mm, TTL=46.10 mm, ER1=10.89 mm, ER2=6.19 mm, D2=22.09 mm, OTTL=49.37 mm, ofb=49.57 mm, f1=22.89 mm, f2=−16.61 mm, f3=−3.22 mm, f4=11.19 mm Lens data of the objective 4 is as follows. The mark * on the side of a surface number means that the surface is an aspheric surface. More specifically, the lens L2 and the lens L11 are aspheric lenses.

| Objective 4 | | | | | |
|---|---|---|---|---|---|
| S | r | d | ne | vd | er |
| 1 | INF | 0.17 | 1.52626 | 54.41 | 10.60 |
| 2 | INF | 3.10 | | | 10.60 |
| 3 | 14.565 | 5.26 | 1.82017 | 46.62 | 10.89 |
| 4 | 54.391 | 6.41 | | | 10.30 |
| 5* | 23.675 | 4.24 | 1.69473 | 31.02 | 6.19 |
| 6 | −10.237 | 1.01 | 1.91137 | 35.04 | 5.26 |
| 7 | 7.129 | 1.90 | 1.70442 | 30.13 | 4.19 |
| 8 | 15.335 | 8.76 | | | 3.94 |
| 9 | −26.063 | 0.65 | 1.88815 | 40.76 | 2.28 |
| 10 | 4.087 | 3.00 | 1.67765 | 32.10 | 2.19 |
| 11 | −4.066 | 0.63 | 1.88815 | 40.76 | 2.21 |
| 12 | 15.158 | 0.77 | | | 2.32 |
| 13 | 9.595 | 2.45 | 1.59667 | 35.31 | 2.60 |
| 14 | −4.760 | 0.71 | 1.88815 | 40.76 | 2.69 |
| 15 | 18.197 | 3.35 | | | 2.97 |
| 16 | 61.103 | 2.80 | 1.53006 | 76.46 | 4.65 |
| 17 | −8.832 | 0.20 | | | 4.95 |
| 18* | 92.668 | 0.60 | 1.85902 | 40.38 | 5.11 |
| 19 | 18.240 | 3.35 | 1.43985 | 94.93 | 5.15 |
| 20 | −10.477 | 56.62 | | | 5.30 |

Aspheric surface data of the objective 4 is as follows.
Surface Number s5
k=0.0000, A4=−5.2267 e−05, A6=−1.4478 e−06, A8=1.2305 e−08, zG2=−0.13
Surface Number s18
k=0.0000, A4=−2.7104 e−05, A6=−6.4543 e−08, A8=−2.3992 e−09

The objective 4 satisfies conditional expressions (1) to (5) as described below.

$$fL/TTL=3.112 \quad (1)$$

$$ER1/ER2=1.76 \quad (2)$$

$$D2/OTTL=0.448 \quad (3)$$

$$ofb/OTTL=1.004 \quad (4)$$

$$|f2/fL|=0.116 \quad (5)$$

Figure 9:
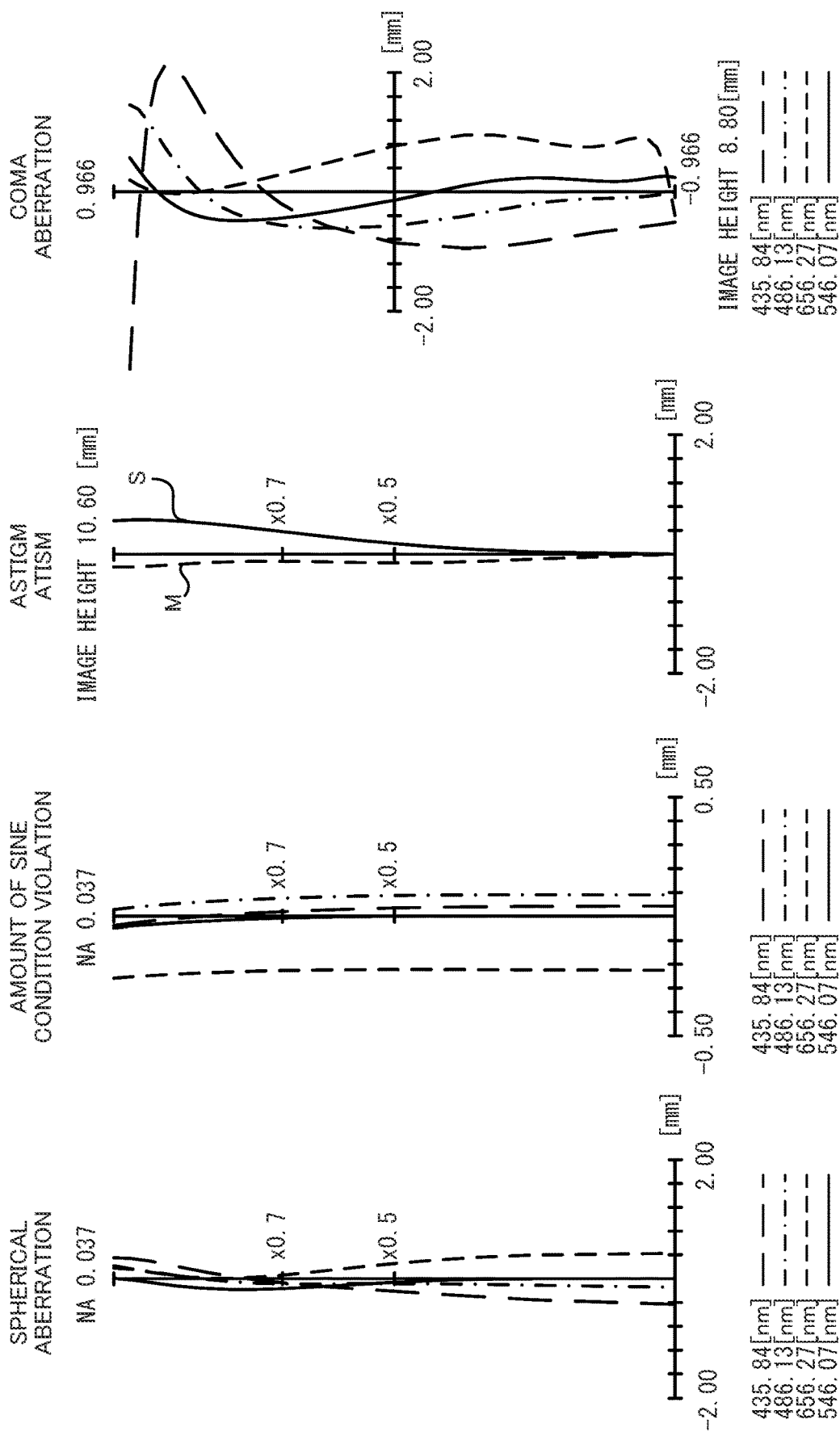
FIGS. 9A to 9D are diagrams of aberrations in an optical system including the objective and the tube lens.

FIGS. 9A to 9D are diagrams of aberrations in an optical system including the objective 4 and the tube lens 10 and illustrate aberrations on an image field on which the objective 4 and the tube lens 10 form an optical image. FIG. 9A is a diagram of spherical aberrations. FIG. 9B is a diagram illustrating the amounts of sine condition violation. FIG. 9C is a diagram of astigmatism. FIG. 9D is a diagram illustrating coma aberrations at an image height ratio of 83% (image height of 8.8 mm). As illustrated in FIGS. 9A to 9D, in the present example, the aberrations are satisfactorily corrected over a wide field of view.

Fifth Example

Figure 10:
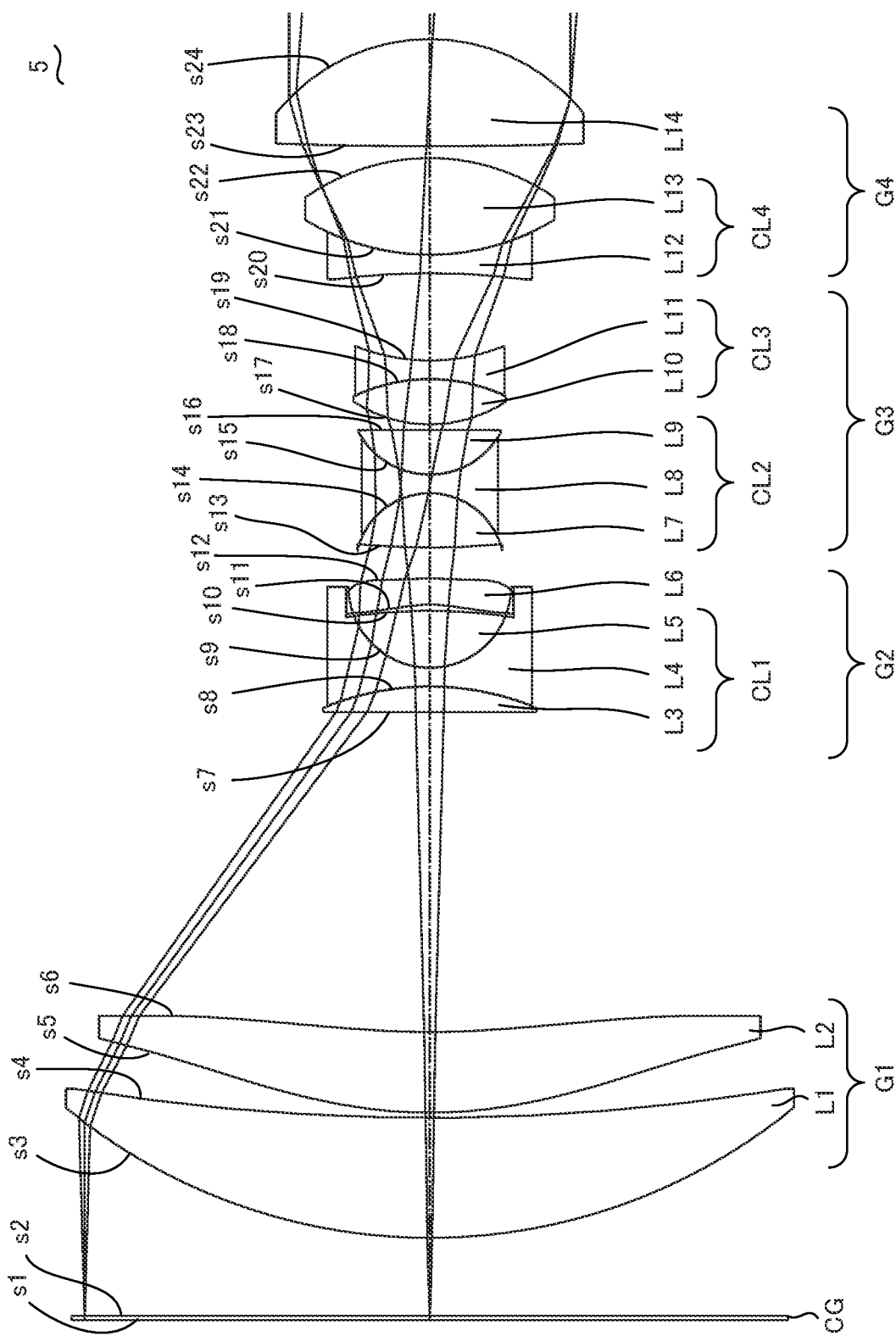
FIG. 10 is a cross-sectional view of an objective according to a fifth example of the present invention.

FIG. 10 is a cross-sectional view of an objective 5 according to the present example. The objective 5 is a microscope objective and includes a first lens group G1 having positive refractive power, a second lens group G2 having one or more aspheric surface(s) and having negative refractive power, a third lens group G3, and a fourth lens group G4 consisting of two lens components and having positive refractive power.

The first lens group G1 includes a lens L1 that is a meniscus lens having a concave surface facing the image side and a lens L2 that is a meniscus lens having a concave surface facing the image side.

The second lens group G2 includes a cemented lens CL1 and a lens L6 that is a meniscus lens having a concave surface facing the object side. The cemented lens CL1 is a three-piece cemented lens including, in order from the object side, a lens L3 that is a meniscus lens having a concave surface facing the object side, a lens L4 that is a biconcave lens, and a lens L5 that is a biconvex lens.

The third lens group G3 includes, in order from the object side, a cemented lens CL2 and a cemented lens CL3. The cemented lens CL2 is a three-piece cemented lens including, in order from the object side, a lens L7 that is a biconvex lens, a lens L8 that is a biconcave lens, and a lens L9 that is a biconvex lens. The cemented lens CL3 is a two-piece cemented lens including, in order from the object side, a lens L10 that is a biconvex lens and a lens L11 that is a biconcave lens.

The fourth lens group G4 consists of, in order from the object side, a cemented lens CL4 and a biconvex lens L14. The cemented lens CL4 is a two-piece cemented lens including, in order from the object side, a lens L12 that is a biconcave lens and a lens L13 that is a biconvex lens.

Various data of the objective 5 is as follows.
NAob=0.030, fL=179.66 mm, TTL=46.07 mm, ER1=13.47 mm, ER2=3.60 mm, D2=28.52 mm, OTTL=49.24 mm, ofb=67.39 mm, f1=22.41 mm, f2=−6.25 mm, f3=−6.13 mm, f4=16.47 mm Lens data of the objective 5 is as follows. The mark * on the side of a surface number means that the surface is an aspheric surface. More specifically, the lens L2 and the lens L6 are aspheric lenses.

| Objective 5 | | | | | |
|---|---|---|---|---|---|
| S | r | d | ne | vd | er |
| 1 | INF | 0.17 | 1.52321 | 56.02 | 13.25 |
| 2 | INF | 3.00 | | | 13.25 |
| 3 | 22.000 | 4.62 | 1.88815 | 40.76 | 13.47 |
| 4 | 83.900 | 0.20 | | | 13.13 |
| 5* | 18.182 | 3.10 | 1.51977 | 52.43 | 12.20 |
| 6* | 34.380 | 12.32 | | | 11.79 |
| 7 | −3193.244 | 0.98 | 1.57829 | 41.50 | 3.60 |
| 8 | −10.511 | 0.70 | 1.88815 | 40.76 | 3.43 |
| 9 | 3.119 | 2.19 | 1.59911 | 39.24 | 2.73 |
| 10 | −20.000 | 0.23 | | | 2.72 |
| 11* | −5.244 | 1.00 | 1.48915 | 70.23 | 2.71 |
| 12* | −16.342 | 1.20 | | | 2.66 |
| 13 | 29.244 | 2.08 | 1.59667 | 35.31 | 2.28 |

-continued

Objective 5

| S | r | d | ne | vd | er |
|---|---|---|----|-----|-----|
| 14 | −2.857 | 0.70 | 1.88815 | 40.76 | 2.07 |
| 15 | 3.100 | 1.71 | 1.69417 | 31.07 | 2.12 |
| 16 | −540.694 | 0.21 | | | 2.24 |
| 17 | 5.255 | 1.75 | 1.67765 | 32.10 | 2.43 |
| 18 | −6.695 | 0.70 | 1.88815 | 40.76 | 2.37 |
| 19 | 7.556 | 3.36 | | | 2.33 |
| 20 | −27.255 | 0.70 | 1.88815 | 40.76 | 3.12 |
| 21 | 9.191 | 3.72 | 1.43985 | 94.93 | 3.44 |
| 22 | −8.276 | 0.45 | | | 4.28 |
| 23 | 174.307 | 4.12 | 1.43985 | 94.93 | 4.96 |
| 24 | −7.504 | 114.70 | | | 5.40 |

Aspheric surface data of the objective 5 is as follows.
Surface Number s5
k=0.5413, A4=−8.2327 e−05, A6=−2.1913 e−07
Surface Number s6
k=−4.0935, A4=−1.0362 e−04, A6=2.8212 e−07
Surface Number s11
k=−10.0000, A4=5.5712 e−03, A6=−2.8766 e−04, zG2=−0.45
Surface Number s12
k=0.9142, A4=8.6320 e−03, A6=−1.0540 e−03, zG2=−0.06

The objective 5 satisfies conditional expressions (1) to (5) as described below.

$$fL/TTL=3.900 \quad (1)$$

$$ER1/ER2=3.75 \quad (2)$$

$$D2/OTTL=0.579 \quad (3)$$

$$ofb/OTTL=1.354 \quad (4)$$

$$|f2/fL|=0.035 \quad (5)$$

FIGS. 11A to 11D are diagrams of aberrations in an optical system including the objective 5 and the tube lens 10 and illustrate aberrations on an image field on which the objective 5 and the tube lens 10 form an optical image. FIG. 11A is a diagram of spherical aberrations. FIG. 11B is a diagram illustrating the amounts of sine condition violation. FIG. 11C is a diagram of astigmatism. FIG. 11D is a diagram illustrating coma aberrations at an image height ratio of 80% (image height of 10.6 mm). As illustrated in FIGS. 11A to 11D, in the present example, the aberrations are satisfactorily corrected over a wide field of view.

What is claimed is:

1. An objective comprising:
in order from a side of an object,
a first lens group that has positive refractive power;
a second lens group that has one or more aspheric surface and has negative refractive power;
a third lens group; and
a fourth lens group that consists of two lens components and has positive refractive power; wherein
following conditional expressions $$1.6 \leq fL/TTL \leq 5 \quad (1)$$

$$1.5 \leq ER1/ER2 \quad (2)$$

$$D2/OTTL \leq 0.6 \quad (3)$$

are satisfied;
a surface of the second lens group that is situated closest to the object side is, among a surface of the objective that have an effective radius of ER 1/1.5 or less, a surface situated closest to the object side; and
a surface of the second lens group that is situated closest to an image side is, among the surface of the objective that are disposed at positions distant from an object plane by a distance of 0.6×OTTL or less on an optical axis, a surface situated closest to the image side; wherein
fL is a focal length of the objective,
TTL is a distance on the optical axis from the surface of the objective that is situated closest to the object side to the surface of the objective that is situated closest to the image side,
ER1 is an effective radius of the surface of the objective that is situated closest to the object side,
ER2 is an effective radius of the surface of the second lens group that is situated closest to the object side,
D2 is a distance on the optical axis from the object plane to the surface of the second lens group that is situated closest to the image side, and
OTTL is a distance on the optical axis from the object plane to the surface of the objective that is situated closest to the image side.

2. The objective according to claim 1, wherein
all of the one or more aspheric surface has a curvature radius that increases as the aspheric surface gets away from the optical axis.

3. The objective according to claim 1, wherein
the fourth lens group has one or more aspheric surface.

4. The objective according to claim 1, wherein
the second lens group includes a cemented lens including one or more positive lens and one or more negative lens.

5. The objective according to claim 3, wherein
the second lens group includes a cemented lens including one or more positive lens and one or more negative lens.

6. The objective according to claim 1, wherein
the objective satisfies a following conditional expression $$0.8 \leq ofb/OTTL \leq 1.4 \quad (4),$$

wherein ofb is a distance on the optical axis from the object plane to a rear focal-point position of the objective.

7. The objective according to claim 3, wherein
the objective satisfies a following conditional expression $$0.8 \leq ofb/OTTL \leq 1.4 \quad (4),$$

wherein ofb is a distance on the optical axis from the object plane to a rear focal-point position of the objective.

8. The objective according to claim 4, wherein
the objective satisfies a following conditional expression $$0.8 \leq ofb/OTTL \leq 1.4 \quad (4),$$

wherein ofb is a distance on the optical axis from the object plane to a rear focal-point position of the objective.

9. The objective according to claim 5, wherein
the objective satisfies a following conditional expression $$0.8 \leq ofb/OTTL \leq 1.4 \quad (4),$$

wherein ofb is a distance on the optical axis from the object plane to a rear focal-point position of the objective.

10. The objective according to claim 1, wherein the objective satisfies a following conditional expression $$0.03 \leq |f2/fL| \leq 0.15 \quad (5),$$

wherein f2 is a focal length of the second lens group.

11. The objective according to claim 3, wherein the objective satisfies a following conditional expression $$0.03 \leq |f2/fL| \leq 0.15 \quad (5),$$

wherein f2 is a focal length of the second lens group.

12. The objective according to claim 4, wherein the objective satisfies a following conditional expression $$0.03 \leq |f2/fL| \leq 0.15 \quad (5),$$

wherein f2 is a focal length of the second lens group.

13. The objective according to claim 5, wherein the objective satisfies a following conditional expression $$0.03 \leq |f2/fL| \leq 0.15 \quad (5),$$

wherein f2 is a focal length of the second lens group.

14. The objective according to claim 6, wherein the objective satisfies a following conditional expression $$0.03 \leq |f2/fL| \leq 0.15 \quad (5),$$

wherein f2 is a focal length of the second lens group.

15. The objective according to claim 7, wherein the objective satisfies a following conditional expression $$0.03 \leq |f2/fL| \leq 0.15 \quad (5),$$

wherein f2 is a focal length of the second lens group.

16. The objective according to claim 8, wherein the objective satisfies a following conditional expression $$0.03 \leq |f2/fL| \leq 0.15 \quad (5),$$

wherein f2 is a focal length of the second lens group.

17. The objective according to claim 9, wherein the objective satisfies a following conditional expression $$0.03 \leq |f2/fL| \leq 0.15 \quad (5),$$

wherein f2 is a focal length of the second lens group.

18. The objective according to claim 2, wherein the second lens group includes a cemented lens including one or more positive lens and one or more negative lens.

19. The objective according to claim 2, wherein the objective satisfies a following conditional expression $$0.8 \leq ofb/OTTL \leq 1.4 \quad (4),$$

wherein ofb is a distance on the optical axis from the object plane to a rear focal-point position of the objective.

20. The objective according to claim 2, wherein the objective satisfies a following conditional expression $$0.03 \leq |f2/fL| \leq 0.15 \quad (5),$$

wherein f2 is a focal length of the second lens group.

21. The objective according to claim 2, wherein the fourth lens group has one or more aspheric surface.

* * * * *